July 27, 1948.   O. C. WILLIAMS   2,445,899
LOOM SHUTTLE
Filed April 11, 1945

INVENTOR.
Otis C. Williams
BY Victor J. Evans & Co.
ATTORNEYS

Patented July 27, 1948

2,445,899

UNITED STATES PATENT OFFICE 2,445,899

LOOM SHUTTLE

Otis C. Williams, Atlanta, Ga.

Application April 11, 1945, Serial No. 587,715

1 Claim. (Cl. 139—196)

My present invention, in its broad aspect, has reference to improvements in shuttles and the manufacture thereof. My shuttle is formed in one piece, and in one operation, of plastic of the type especially adaptable for the exacting and special uses and conditions to which a shuttle is put, and the metal points, bobbin clip and the like are molded directly into the material of the shuttle and, accordingly, will not become loose.

At the present time, shuttles are made of selected wood (usually dogwood or persimmon wood) and much care and many operations are necessary to complete a wooden shuttle, which in use is subject to many disadvantages. Furthermore, wood shuttles are becoming increasingly expensive, and suitable wood scarcer and harder to get. My present shuttle, when molded of a suitable plastic, is relatively inexpensive since the molding operation is performed in a single step and the completed shuttle shows greater impact strength, and flexural and tensile strength than wood, and has water, acid, caustic and heat resistance, and is not subject to atmospheric changes, and the points and other accessories will not work loose as with a wood shuttle, and my shuttle will not split, crack or splinter as will a wood shuttle. My shuttle can be made in any and all sizes and is sturdy, practical, economical, and efficient for the work intended.

Other and equally important objects and advantages of my invention will be apparent from the following description and drawings, and it is pointed out that changes in form, size, shape, materials, and construction and arrangement of parts is permissible and within the purview of my broad inventive concept, and the scope of the appended claim.

In the drawings, wherein I have illustrated a preferred form of my invention:

In the drawings, wherein like characters of reference are used to designate like or similar parts.

Figure 1:
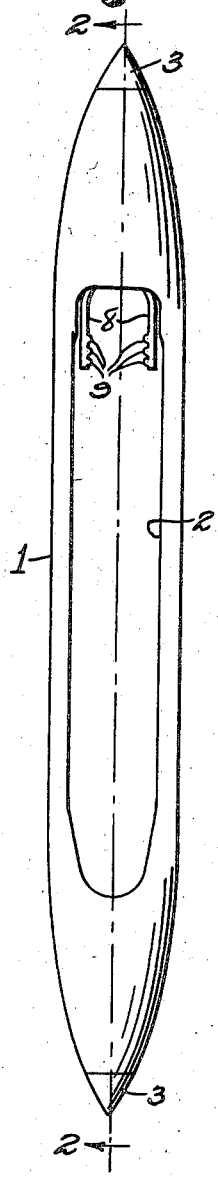
Figure 1 is a top plan view.
Figure 2:
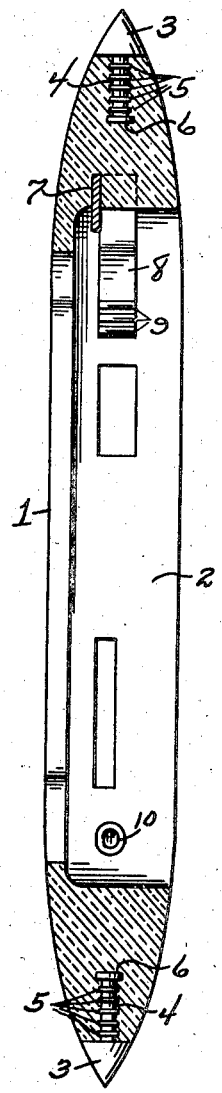
Figure 2 is a longitudinal section on the line 2—2 of Figure 1.
Figure 3:
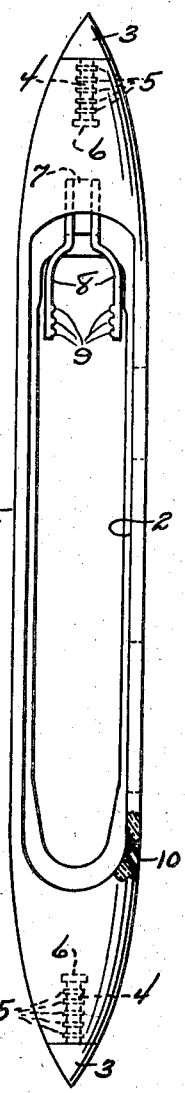
Figure 3 is a bottom plan view partly broken away.

The numeral 1 designates my shuttle body which is molded of plastic in a mold in a single operation, with the mold preferably constructed in halves and kept chilled. I have found the following plastics suitable from the standpoint of toughness, impact and flexural and tensile strength, and resistance to water, acid, caustic and heat, as well as hardness, resistivity and moldability: Phenolic of the general purpose type or types which are transparent, and heat, acid, caustic and shock resistant; urea; polystyrene; cellulose-acetate; aceto-butyrate; ethyl-cellulose; methyl methacrylate or vinyl with no filler. Any one or more of the above plastics may be used, as well as others which I have not enumerated. My shuttle has the usual bobbin opening 2, and the points, bobbin clip and the like, are molded directly into the plastic body so that they cannot become loose. The metal points 3 have shanks 4 formed with spaced apart, annular anchoring flanges 5 and a head 6. The metal bobbin clip has a base 7 molded into the plastic and outwardly curved and flared arms 8 which are parallel throughout a part of their length and provided with teeth 9, and a metal eye 10 is molded into the plastic at an angle for guiding the thread.

My plastic shuttle resists wear and abrasion at each end of the lay on the loom when it enters the box, and will not split like wood when subject to the slam of the loom, which occurs when the shuttle is caught between the boxes and the lay comes forward.

From the foregoing, it is believed that the operation and advantages of my invention will be apparent, but it is again emphasized that interpretation of the scope of my invention should only be conclusive when made in the light of the subjoined claim.

I claim:

A shuttle comprising an elongated plastic body rectangular-shape in cross section with pointed ends and having a bobbin receiving cavity in the intermediate portion extending through the body from the upper to the lower surfaces thereof to permit passage of a bobbin through the shuttle, a pair of bobbin supporting gripper arms positioned in one end of the cavity and molded into the plastic body, conical-shaped metal points with shanks having ridges thereon providing the ends of the shuttle with shanks thereof molded into the plastic body, and a metal eye providing a thread guide molded into the said plastic body and spaced from one end of the cavity, said plastic having sufficient toughness and tensile strength to insure increased wearing characteristics as compared with other materials.

OTIS C. WILLIAMS.

REFERENCES CITED

The following references are of record in the file of this patent:

UNITED STATES PATENTS

| Number | Name | Date |
|---|---|---|
| 1,805,090 | Hills | May 12, 1931 |
| 2,255,184 | Osenberg | Sept. 9, 1941 |

FOREIGN PATENTS

| Number | Country | Date |
|---|---|---|
| 21,144 | Great Britain | 1902 |
| 328,081 | Italy | July 26, 1935 |
| 502,120 | Great Britain | Mar. 13, 1939 |